(12) United States Patent
Kühne et al.

(10) Patent No.: US 8,485,553 B1
(45) Date of Patent: Jul. 16, 2013

(54) FRONTAL AIRBAG ASSEMBLY

(71) Applicant: Autoliv Development AB, Värgärda (SE)

(72) Inventors: Klaus-Peter Kühne, Karlsfeld (DE); Stephan Storfinger, Markt Indersdorf (DE)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/655,529

(22) Filed: Oct. 19, 2012

(51) Int. Cl.
*B60R 21/16* (2006.01)
(52) U.S. Cl.
USPC .................................. 280/732; 280/743.2
(58) Field of Classification Search
USPC .................... 280/732, 743.1, 743.2
See application file for complete search history.

(56) References Cited

U.S. PATENT DOCUMENTS

| | | | | |
|---|---|---|---|---|
| 5,004,266 A * | 4/1991 | Miller et al. | ............... | 280/743.2 |
| 5,765,867 A * | 6/1998 | French | ..................... | 280/743.2 |
| 5,823,566 A * | 10/1998 | Manire | ..................... | 280/728.3 |
| 6,070,904 A * | 6/2000 | Ozaki et al. | ................ | 280/743.1 |
| 6,474,686 B1 * | 11/2002 | Higuchi et al. | ............ | 280/743.1 |
| 7,731,230 B2 * | 6/2010 | Fischer et al. | ................ | 280/732 |
| 7,770,925 B2 | 8/2010 | Seymour et al. | | |
| 2003/0189319 A1 * | 10/2003 | Soderquist | ................. | 280/728.3 |
| 2003/0234520 A1 * | 12/2003 | Hawthorn et al. | ......... | 280/728.1 |
| 2007/0057487 A1 * | 3/2007 | Kim | ........................... | 280/728.2 |
| 2007/0138779 A1 * | 6/2007 | Kwon | ......................... | 280/743.2 |
| 2008/0217892 A1 * | 9/2008 | Maripudi et al. | ............ | 280/740 |
| 2009/0152842 A1 * | 6/2009 | Benny et al. | ................ | 280/728.3 |
| 2011/0088356 A1 | 4/2011 | Lachat et al. | | |
| 2011/0121548 A1 * | 5/2011 | Maripudi et al. | ............ | 280/740 |

* cited by examiner

*Primary Examiner* — Toan To
*Assistant Examiner* — Robert A Coker
(74) *Attorney, Agent, or Firm* — Brinks Hofer Gilson & Lione

(57) ABSTRACT

A frontal airbag assembly has a housing defining an airbag space. An inflatable compacted airbag cushion is arranged in the airbag space and has a gas inlet connected to a gas generator. A wrapper having a front end attached outside of the housing to the front wall or the bottom wall of the housing and a rear end attached to the rear wall or the bottom wall of the housing. A guide flap extends between the wrapper and the airbag cushion and has an outer end attached to the wrapper between the front end and a split line of the wrapper, a first inward fold between the split line and the rear wall, and an inner end arranged between the wrapper and an upper portion of the front wall. The guide flap is released when the split line has separated the wrapper into a front portion and a rear portion.

12 Claims, 5 Drawing Sheets

FRONTAL AIRBAG ASSEMBLY

TECHNICAL FIELD

The present invention relates to airbags for motor vehicles. More particularly, the present invention relates to frontal airbags for a front passenger of a motor vehicle.

BACKGROUND OF THE INVENTION

Effective Sep. 1, 2003, the National Highway Traffic Safety Administration (NHTSA) upgraded vehicle occupant crash protection requirements in Federal Motor Vehicle Safety Standard No. 208 (FMVSS 208) for airbags in passenger cars and light trucks, requiring so-called "advanced airbags." Design challenges exist when seeking to provide protection for passengers positioned very close to the airbag when the airbag starts to deploy. Among others, the upgrade was designed to meet the goals of improving protection for unbelted child seat occupants that are "out of position" when the airbag starts deployment.

FMVSS 208 requires certain test criteria for a Position 1 with a 3-year-old or 6-year-old dummy standing upright in front of the instrument panel with the head almost at the windscreen. Further test criteria are in place for a Position 2, in which the 3-year-old or 6-year-old dummy is sitting in the front portion of the passenger seat and is tilted toward the instrument panel so that the knees contact the glove compartment area.

SUMMARY OF THE INVENTION

According to a first aspect of the present invention, a frontal airbag assembly is provided for protecting a seat occupant of a front passenger seat in a motor vehicle. The airbag assembly includes a housing with a front wall facing the passenger compartment, a rear wall remote from the passenger compartment, a bottom wall and an open top, the housing defining an airbag space; an inflatable compacted airbag cushion arranged in the airbag space and having a gas inlet; a gas generator attached to the housing near the bottom wall and having a gas outlet in fluid connection with the gas inlet of the airbag cushion; a wrapper having a front end attached outside of the housing to the front wall or the bottom wall and a rear end attached to the rear wall or the bottom wall. The wrapper extends from the front end upward to the open top, rearward across at least a portion of the open top and to the rear end. A split line in the wrapper extends in a transverse direction in an area covering the open top and is configured to tear during an inflation of the airbag cushion and to split the wrapper into a front portion and a rear portion. A guide flap extends between the wrapper and the airbag cushion and has an outer end attached to the wrapper between the front end and the split line, a first inward fold between the split line and the rear wall, and an inner end arranged between the wrapper and an upper portion of the front wall. The guide flap is configured to guide the inflation of the airbag cushion. This arrangement allows for release of the guide flap once the split line has separated the wrapper into a front portion and a rear portion.

According to another aspect of the invention, the inner end of the guide flap is wedged between the wrapper and the upper front wall. Thus, no additional stiches or attachments are required, and the inner end of the guide flap is free to move outward once the wrapper gives way.

According to a further aspect of the invention, the guide flap further includes a cut-out in the first inward fold splitting the inward fold into two lateral tongues configured to pass a nose of the seat occupant on both lateral sides. The cut-out allows the guide flap to pass the nose of the seat occupant when the seat occupant is in Position 1.

According to yet another aspect of the invention, the wrapper has voids enabling a visual inspection for proper installation of the inner end of the guide flap. These voids simplify quality control by detecting a color underneath the voids that either corresponds to the color of the wrapper or to the color of the underlying housing.

BRIEF DESCRIPTION OF THE DRAWINGS

The attached drawings have been included for illustrative purposes only and are not intended to limit the scope of the present invention. In the drawings.

DETAILED DESCRIPTION OF THE INVENTION

Figure 1:
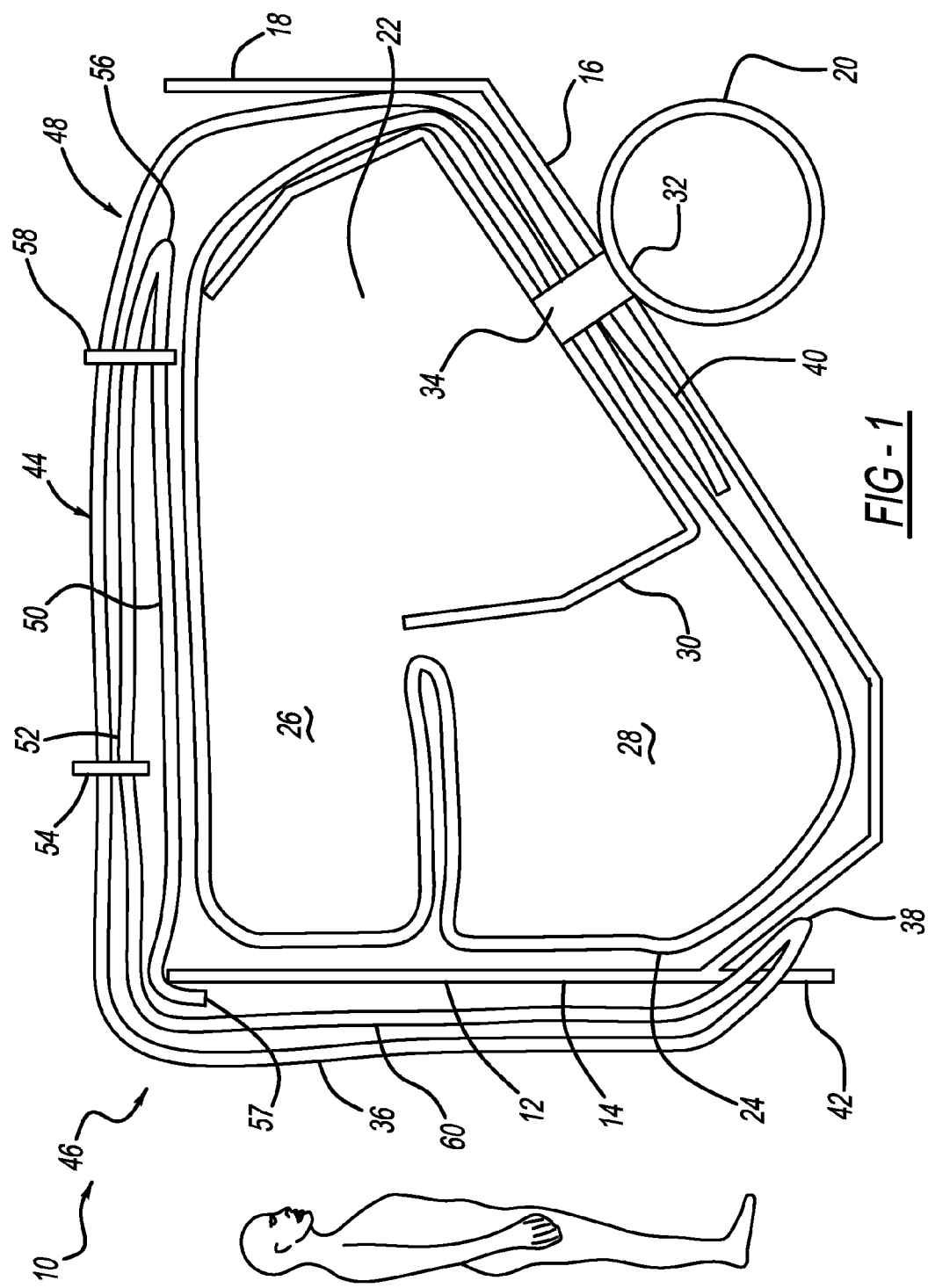
FIG. 1 shows a schematic cross-section of a frontal passenger airbag subassembly before inflation.

FIG. 1 is a schematic cross-sectional view of a frontal airbag subassembly 10 providing an improved protection of out-of-position seat occupants. An airbag housing 12 has a generally u-shaped profile with a front wall 14, a bottom wall 16, a rear wall 18, and an open top. The front wall 14 faces a vehicle passenger compartment, and the rear wall 18 is located remote from the passenger compartment toward the front of the vehicle. The bottom wall 16 has a sloped portion that is tilted after installation toward a passenger compartment of a motor vehicle so that the bottom wall 16 is higher near the rear wall 18 that faces an automotive windshield than near the front wall 14 that faces the passenger compartment.

A gas generator 20 is secured to the housing 12 and in fluid communication with the housing interior 22. While the drawing indicates a generally cylindrical gas generator 20 with a horizontal cylinder axis generally parallel to the bottom wall 16, other arrangements include so-called pancake inflators that are puck-shaped and may have a cylinder axis perpendicular to the bottom wall 16.

Inside the housing interior 22, an airbag cushion 24 is arranged in a compacted state. The schematic drawing does not show all folds and rolls of the airbag cushion 24 and only indicated major regions, such as a head region 26 and a torso region 28.

A gas deflector 30 is arranged inside the airbag cushion 24. The gas deflector 30 is generally cup-shaped or bowl-shaped and has a bottom generally extending parallel to the sloped portion of bottom wall 16. The gas generator 20 has a gas outlet 32 in fluid communication with a gas inlet 34 of the airbag cushion 24 through the bottom of the gas deflector 30. The shape of the gas deflector 30 guides gas released from the gas generator 20 primarily to the head region 26 of the airbag cushion 24.

A wrapper 36 envelopes the airbag cushion 24 and most of the front wall 14 of the housing 12. The wrapper 36 has a front end 38 engaged with the front wall 14 of the housing 12 near the bottom wall 16. For example, noses 42 formed on the front wall 14 may be hooked into slits or holes in the front end 38. The wrapper 36 further has a rear end 40 arranged between the airbag cushion 24 and the bottom wall 16 and secured to the bottom wall 16 by the deflector 30. Alternatively, the front end 38 may extend further and may be attached to the bottom wall 16. Conversely, the rear end 40 may be shorter and may be attached to the rear wall 18 without leaving the scope of the present invention.

The wrapper 36 extends from the front end 38 upward along the outside of the front wall 14, across the open top of the housing 12, and downward along the inside of the rear wall 18 to the rear end 40. In an area where the wrapper 36 extends across the open top, a split line 44 extends through the wrapper 36 in a horizontal direction, parallel to the front wall 14 and to the rear wall 18. The split line is configured to break apart under pressure when the airbag deploys. Thus, during inflation of the airbag cushion 24, the wrapper 36 is separated into a front portion 46 and a rear portion 48. Although the split line 44 is shown as a straight line in subsequent drawings, any configuration of the split line 44 that sufficiently opens the wrapper during airbag expansion to allow the expansion of the airbag cushion 24 is within the scope of the present invention.

A guide flap 50 is arranged between the wrapper 36 and the airbag cushion 24 in an area covering at least a portion of the open top of the housing 12. The guide flap 50 has an outer end 52 secured to the front portion 46 of the wrapper 36 via a durable seam 54. Instead of a seam, other durable methods of securing the guide flap 50 to the wrapper 36 may be used without leaving the scope of the present invention. Suitable alternatives include adhesives or lamination.

From the outer end 52, the guide flap 50 extends toward the rear wall 18 and has a lateral inward fold 56 in an area between the split line 44 and the rear wall 18. From the fold 56, the guide flap 50 extends past the front wall 14 and has an inner end 57 wedged between an upper portion of the front wall 14 and the wrapper 36. Near the inward fold 56, the wrapper 36 is attached to the rear portion 48 of the wrapper 36 with a temporary seam 58 configured to break during the airbag deployment.

In the embodiment shown, the wrapper 36 and the guide flap 50 are unitarily formed from one piece of fabric. The term "fabric" is used herein in a broad sense that includes woven and non-woven tissues. In the unitary structure shown, the front end 38 of the wrapper 36 is formed by a further inward fold of the fabric so that the wrapper 36 has a second, interior layer 60 extending from the front end 38 to the outer end 52. The durable seam 54 defines a transition from the interior layer 60 of the wrapper 36 to the guide flap 50. If the wrapper 36 and the guide flap 50 are cut from separate pieces of fabric, the wrapper 36 may not include an interior layer, and the durable seam would secure the outer end 52 of the guide flap 50 to the wrapper 36.

Figure 2:
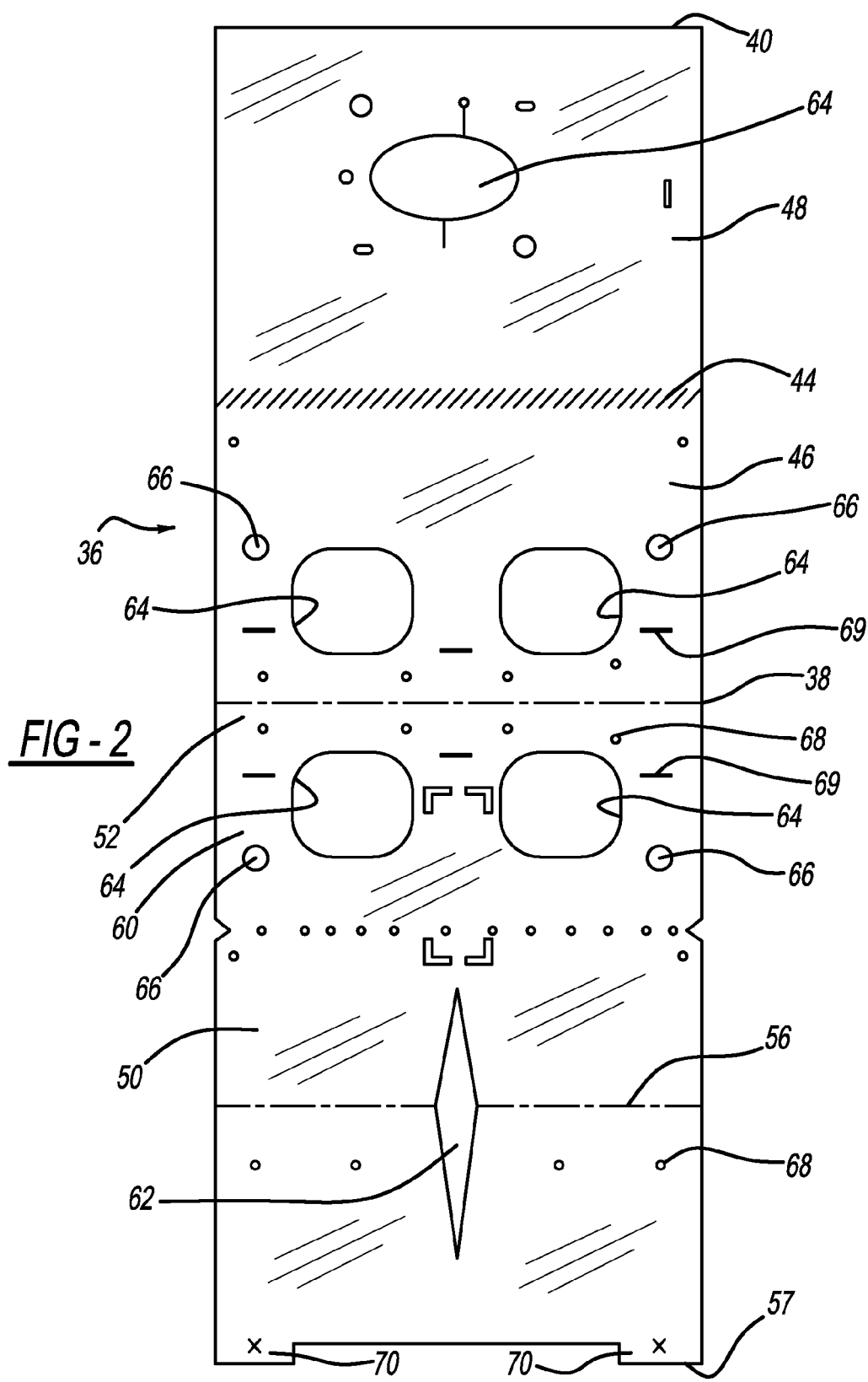
FIG. 2 shows an embodiment of a sewing pattern for an airbag wrapper unitarily formed with a guide flap suitable for the airbag of FIG. 1.

Now referring to FIG. 2, the unitary piece of fabric forming the wrapper 36 and the guide flap 50 of FIG. 1 may be cut according to the sewing pattern shown in FIG. 2. The rear end 40 of the wrapper 36 is shown at the top of FIG. 2, while the front end 38 of the wrapper 36 is approximately in the center of the pattern. The split line 44 is marked with hatching between the front end 38 and the rear end 40. The pattern continues below the front end 38 with the interior layer 60 of the wrapper 36. Notches on the lateral sides of the fabric pattern indicate the position of the durable seam 54 marking the transition from the interior layer 60 to the outer end 52 of the guide flap 50. The fold 56 of the guide flap 50 is indicated with a broken line, and the inner end 57 is shown at the bottom of the drawing.

The fold 56 has a central center cut-out 62 that is approximately diamond-shaped. The legs of the diamond shape may be longer on the side facing the inner end 57 than on the side facing the wrapper 36. The center cut-out 62 may alternatively be shaped like an oval or any other elongated shape performing the function of a void as will be described below in more detail.

Figure 4:
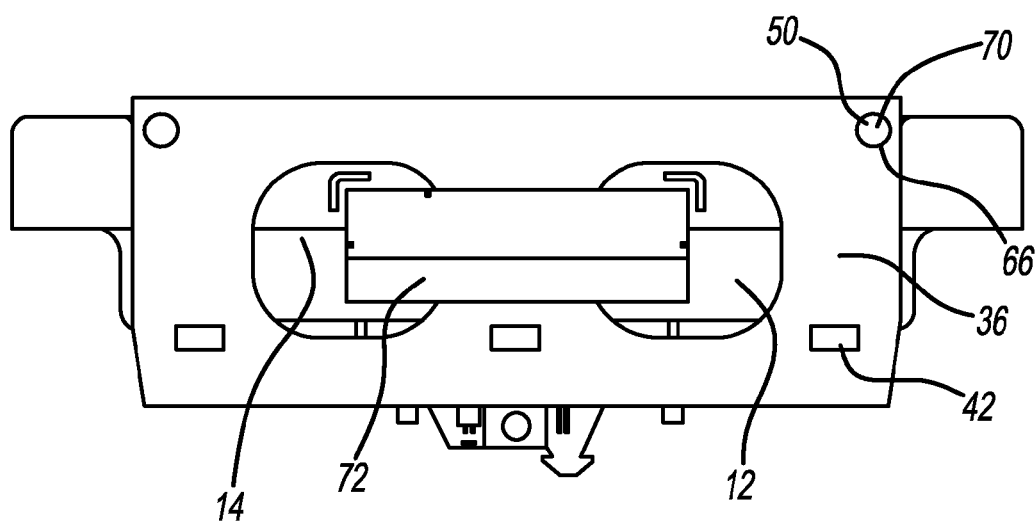
FIG. 4 shows a facial view of a frontal airbag subassembly according to the schematic set-up illustrated in FIG. 1.

Several further cut-out sections are arranged in the wrapper 36. The rear portion 48 has a port hole 64 for the gas inlet 34. The front portion 46 and the interior layer 60 comprise an arrangement of cut-outs that is symmetric with respect to the folded front end 38 of the wrapper 36. On each side of the fold, two rounded rectangular openings 64 are provided to allow fastening of a label to the front wall 14 of the housing 12 through the wrapper 36, as shown in FIG. 4.

Close to the lateral edges of the wrapper 36 on each lateral side, a smaller viewing hole 66 is located on each side of the folded front end 38. As will be described later, these viewing holes 66 allow for visual inspection whether the guide flap 50 has been properly positioned under the wrapper 36.

Further markings 68 indicate locations for durable and temporary seams. Further, slits on both sides of the front end 38 are provided for engaging the noses 42 (FIG. 1) for securing the front end 38 of the wrapper 36 to the housing 12.

At the inner end 57, the guide flap 50 has two tabs 70 located proximate the lateral sides of the guide flap 50. After assembly of the airbag assembly shown in FIG. 1, these tabs 70 are visible through the viewing holes 66.

Figure 3:
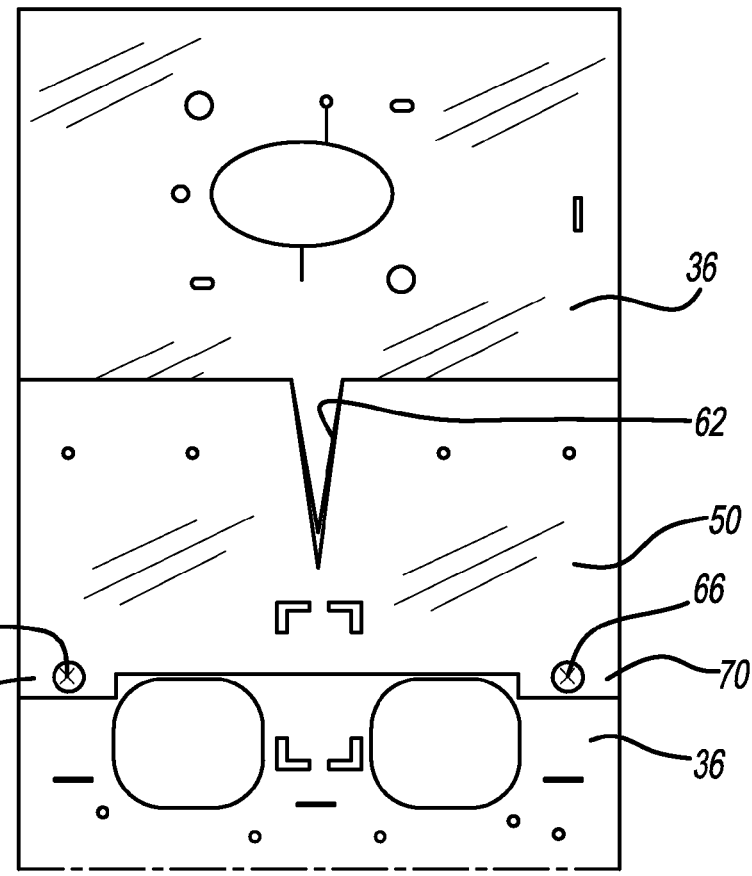
FIG. 3 shows an airbag wrapper cut according to the sewing pattern of FIG. 2 with an attached guide flap viewed from a side facing an airbag.

FIG. 3 shows the wrapper 36 with integrated guide flap 50 after the front end 38 and the fold 56 have been folded. The view of FIG. 3 shows the side of the fabric that becomes the inside of the wrapper 36 and of the guide flap 50 in the subassembly shown in FIG. 1. It is evident from FIG. 3 that the center cut-out 62 forms a central recess in the guide flap 50. Indicated with a broken line are the viewing holes 66 covered by the tabs 70. The tabs 70 are typically white like the remainder of the fabric of the guide flap 50. The housing 12 typically has a color other than white, for example black. Once the wrapper 36 is installed in the subassembly 10, the tabs 70 make the viewing holes 66 appear white. If the guide flap 50 is installed incorrectly, the housing color is visible through the viewing holes 66. Thus, the viewing holes 66 in combination with the tabs 70 give unambiguous information on proper or improper arrangement of the guide flap 50 under the wrapper 36.

FIG. 4 shows the subassembly of FIG. 1 viewed from the position of the seat occupant after installation. Noses 42 extend through slits 69. A label 72 is attached to the front wall 14 of the housing 12. The visual holes 66 disclose the tabs 70 of the guide flap 50. If the visual holes 66 showed a different color than the color of the tabs 70, the guide flap 50 would need a readjustment.

FIGS. 5 through 8 illustrate the deployment of the airbag cushion 24 for child occupants positioned closely in front of the airbag subassembly 10. The following airbag inflation behavior is illustrated for Positions 1 and 2. Position 1 corresponds to a 3-year-old or 6-year-old dummy standing upright in front of the instrument panel with the head almost at the windscreen. In Position 2, the 3-year-old or 6-year-old dummy is sitting it the front portion of the passenger seat and is tilted toward the instrument panel so that the knees contact the glove compartment area.

Figure 5:
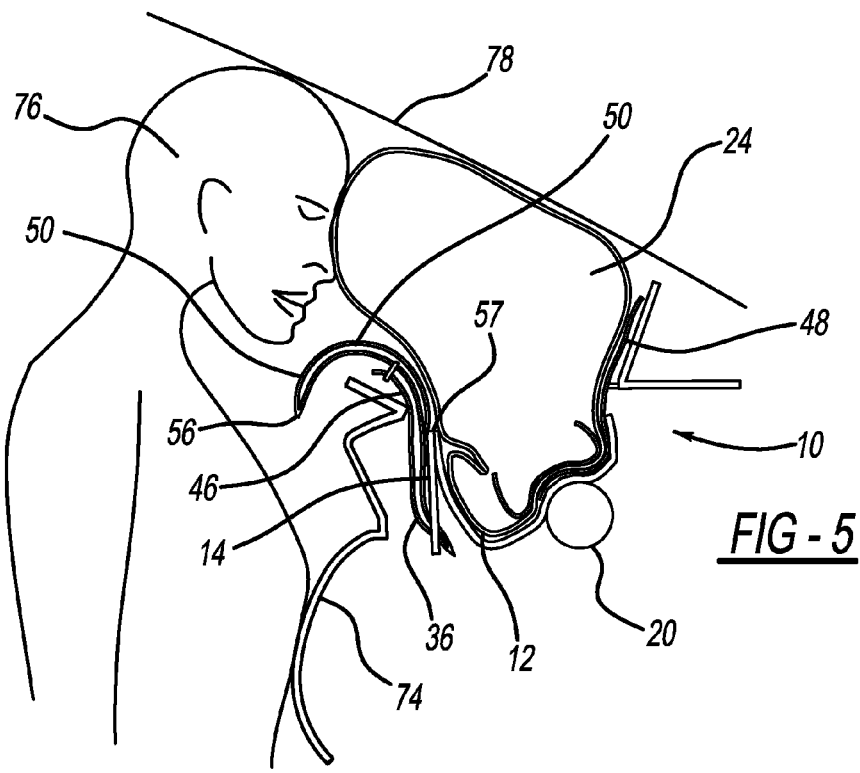
FIG. 5 shows a cross-sectional side view of a frontal airbag assembly according to the schematic set-up illustrated in FIG. 1 with a seat occupant situated in Position 1 at the start of deployment.
Figure 6:
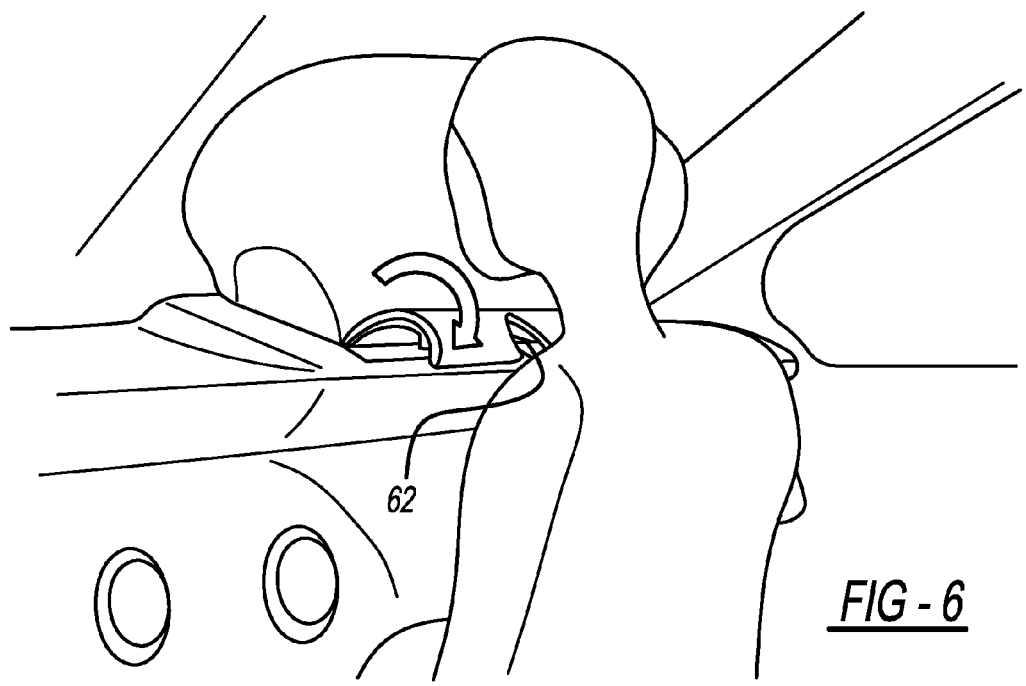
FIG. 6 shows the airbag assembly of FIG. 5 in the same situation as FIG. 5 viewed from an oblique angle.
Figure 7:
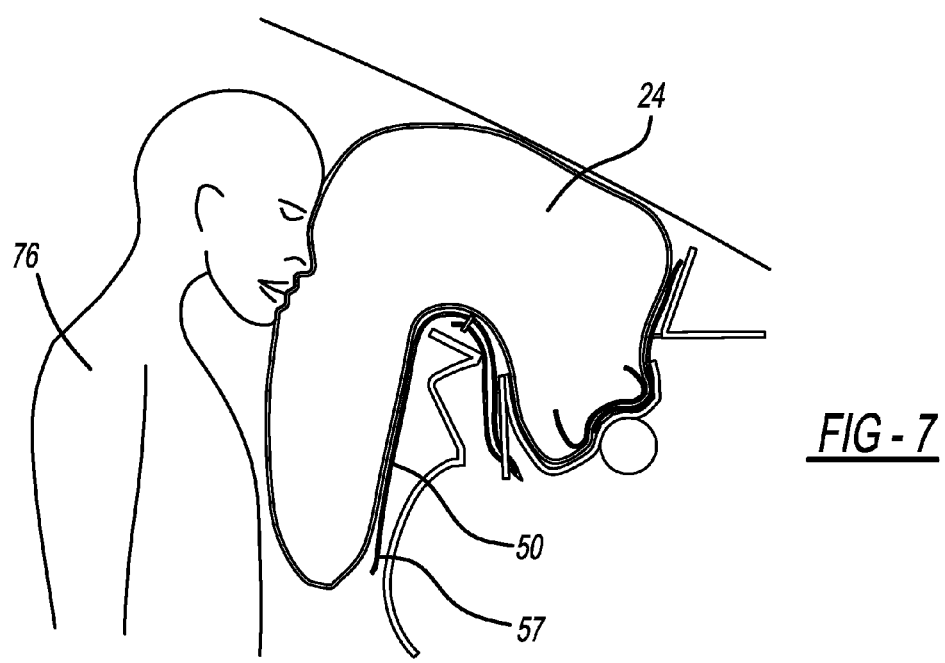
FIG. 7 shows the view of FIG. 5 at an advanced state of deployment.
Figure 8:
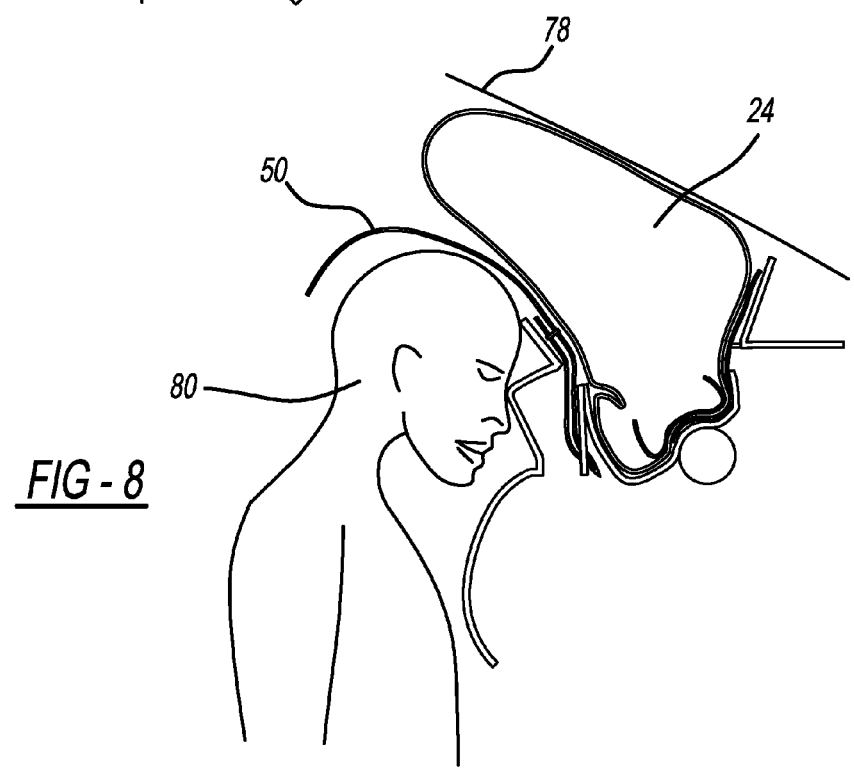
FIG. 8 shows a cross-sectional side view of a frontal airbag assembly according to the schematic set-up illustrated in FIG. 1 with a seat occupant situated in Position 2 at the start of deployment.

For Position 1, a portion of the frontal airbag volume should expand between the child dummy and the instrument panel, and another portion of the frontal airbag volume should expand between head of the child dummy and the windshield. In Position 2, the passenger airbag should deploy above the head of the child dummy. FIGS. 5 through 7 illustrate the airbag inflation for Position 1, while FIG. 8 illustrates the airbag inflation for Position 2.

FIGS. 5 and 6 show an initial stage of the airbag deployment for Position 1 in two different views. In the cross-sectional view of FIG. 5, the airbag subassembly 10 is shown as mounted in an instrument panel structure 74. The gas generator 20 has just started to inflate the airbag cushion 24. The wrapper 36 has been split into the front portion 46 and the rear portion 48. The temporary seam 58 (not shown) has been severed so that the fold 56 of the guide flap 50 has been pushed outward by the airbag cushion 24. A child dummy 76 resides in Position 1 with the head close to the instrument panel structure 74 and to a windshield 78 so that the head is located close to, but mostly above the instrument panel structure 74.

FIG. 6 shows that the guide flap 50 has been able to move downward past the dummy's face because the center cut-out 62 has prevented that the guide flap 50 is caught on the dummy's face. The center cut-out 62 splits the fold 56 into two lateral tongues passing the dummy's face on both lateral sides. Compared to one continuous fold 56, the split fold 56 forming the tongues provides more flexibility to the guide flap 50.

The airbag cushion 24 initially expands upward between the instrument panel structure 74 and the windshield 78. Once the wrapper 36 has moved away from the open top and subsequently from the front wall 14 of the housing 12, the inner end 57 of the guide flap 50 is released. The inner end 57 of the guide flap 50 is arranged and dimensioned to be released by the front portion 46 of the wrapper 36 when the front portion 46 rotates outward from the open top by more than about 90°.

FIG. 7 shows a subsequent stage of the airbag deployment for FIGS. 5 and 6. The fold 56 is now unfolded, and the inner end 57 of the guide flap 50 is extended downward. In this position, the airbag cushion 24 is free to expand downward toward the chest and torso area of the child dummy 76. Thus both head and torso of the child dummy 76 are cushioned.

FIG. 8 shows an initial stage of deployment similar to that of FIGS. 5 and 6. In FIG. 8, however, a child dummy resides in Position 2 where the head is located mostly below the top surface of the instrument panel structure 74. Because the head of the child dummy 80 is lower than in the previous figures and close to the instrument panel structure 74, the guide flap 50 cannot slip downward past the child dummy's head and instead unfolds over the child dummy's head. Subsequently, the guide flap 50 protects the head from abrasions that might be caused by the further expanding airbag cushion 24 and reduces the friction caused by the airbag cushion 24 passing the head of the child dummy. The further expansion of the airbag cushion 24 occurs along the windshield 78 over the child dummy's head.

Thus, the unfolded position of the guide flap 50 determines the direction of airbag inflation and accounts for different requirements prescribed of Positions 1 and 2.

The foregoing description of an embodiment of the invention has been presented for purposes of illustration and description. It is not intended to be exhaustive or to limit the invention to the precise embodiment disclosed. Numerous modifications or variations are possible in light of the above teachings. The embodiment discussed was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A frontal airbag assembly for protecting a seat occupant of a front passenger seat in a motor vehicle, the airbag assembly comprising:
   a housing with a front wall, a rear wall, a bottom wall and an open top, the housing defining an airbag space;
   an inflatable compacted airbag cushion arranged in the airbag space and having a gas inlet;
   a gas generator attached to the housing and having a gas outlet in fluid connection with the gas inlet of the airbag cushion;
   a wrapper having
      a front end attached outside of the housing to the front wall or the bottom wall, and
      a rear end attached to the rear wall or the bottom wall, the wrapper extending from the front end upward to the open top, rearward across at least a portion of the open top and to the rear end;
   a split line in the wrapper extending in a transverse direction in an area covering the open top, the split line configured to tear during an inflation of the airbag cushion and to split the wrapper into a front portion and a rear portion; and
   a guide flap extending between the wrapper and the airbag cushion and configured to guide the inflation of the airbag cushion, the guide flap having
      an outer end attached to the wrapper between the front end and the split line,
      a first inward fold between the split line and the rear wall, and
      an inner end arranged between the wrapper and an upper portion of the front wall.

2. The airbag assembly of claim 1, wherein the inner end is wedged between the wrapper and an upper portion of the front wall.

3. The airbag assembly of claim 1, wherein the guide flap further comprising a cutout in the first inward fold splitting the inward fold into two lateral tongues configured to pass a nose of the seat occupant on both lateral sides.

4. The airbag assembly of claim 1, further comprising that the front end of the wrapper is a second inward fold and that underneath an outer layer of the wrapper an inner layer of the wrapper extends from the second inward fold to the outer end of the guide flap.

5. The airbag assembly of claim 4, further comprising that the inner layer of the wrapper is attached to the outer end of the guide flap.

6. The airbag assembly of claim 5, wherein the wrapper and the guide flap are unitarily cut from one fabric sheet.

7. The airbag assembly of claim 1, further comprising that the front end has laterally distributed openings and that the housing has laterally distributed noses, the front end being fastened to the housing by the noses extending through the openings.

8. The airbag assembly of claim 1, further comprising that the wrapper has voids enabling a visual inspection for proper installation of the inner end of the guide flap.

9. The airbag assembly of claim 1, wherein the airbag cushion has a head region and an abdominal region, the head region configured to protect the head of an average adult seat occupant and the abdominal region configured to protect the abdomen of the average adult seat occupant, the airbag assembly further comprising a deflector arranged inside the airbag cushion around the gas inlet, the deflector having a shape promoting an initial gas flow into the head region of the airbag cushion.

10. The airbag assembly of claim 1, the inner end of the guide flap is arranged and dimensioned to be released by the front portion of the wrapper when the front portion rotates from the open end by more than about 90°.

11. The airbag assembly of claim 10, wherein the guide flap is configured to unfold downward between an instrument panel structure and a head located near a vehicle windshield adjacent to the instrument panel structure when the head is located mostly above the instrument panel structure.

12. The airbag assembly of claim 10, wherein the guide flap is configured to unfold between a vehicle windshield and a head located near an instrument panel structure adjacent to the windshield when the head is located mostly below a top surface of the instrument panel structure.

\* \* \* \* \*